(12) United States Patent
Winter

(10) Patent No.: US 11,352,797 B2
(45) Date of Patent: Jun. 7, 2022

(54) PLATFORM TRANSITION AND INTERFACE FOR THE SAME

(71) Applicant: Homecare Products, Inc., Algona, WA (US)

(72) Inventor: Ronald S. Winter, Pacific, WA (US)

(73) Assignee: Homecare Products, Inc., Algona, WA (US)

( * ) Notice: Subject to any disclaimer, the term of this patent is extended or adjusted under 35 U.S.C. 154(b) by 343 days.

(21) Appl. No.: 16/439,312

(22) Filed: Jun. 12, 2019

(65) Prior Publication Data

US 2019/0383022 A1   Dec. 19, 2019

Related U.S. Application Data

(60) Provisional application No. 62/722,114, filed on Aug. 23, 2018, provisional application No. 62/685,072, filed on Jun. 14, 2018.

(51) Int. Cl.
*B65G 69/30* (2006.01)
*E04F 11/00* (2006.01)

(52) U.S. Cl.
CPC ............ *E04F 11/002* (2013.01); *B65G 69/30* (2013.01)

(58) Field of Classification Search
CPC ........ E04F 11/002; B65G 69/30; A61G 3/061
USPC ........................................................ D34/32
See application file for complete search history.

(56) References Cited

U.S. PATENT DOCUMENTS

| | | | | |
|---|---|---|---|---|
| 2,851,744 A | * | 9/1958 | Oehmig | E06B 7/2309 49/469 |
| 3,423,780 A | * | 1/1969 | Alten | B65G 69/287 14/69.5 |
| 3,735,440 A | * | 5/1973 | Hetmanski | E01D 15/24 14/71.1 |
| 3,984,891 A | * | 10/1976 | Weinmann | B65G 69/30 14/69.5 |
| 4,853,999 A | * | 8/1989 | Smith | B65G 69/287 14/69.5 |
| 5,347,672 A | * | 9/1994 | Everard | A61G 3/061 14/69.5 |
| 5,446,937 A | * | 9/1995 | Haskins | B65G 69/287 14/69.5 |
| 5,755,013 A | * | 5/1998 | Fitch | F16L 3/237 24/16 PB |
| 5,815,871 A | * | 10/1998 | Borchardt | B65G 69/2823 14/71.1 |

(Continued)

FOREIGN PATENT DOCUMENTS

| | | | | |
|---|---|---|---|---|
| DE | 2026274 A1 | * | 12/1971 | B65G 69/30 |
| FR | 1424944 A | * | 1/1966 | B65G 69/30 |

*Primary Examiner* — Thomas B Will
*Assistant Examiner* — Katherine J Chu
(74) *Attorney, Agent, or Firm* — Polsinelli PC

(57) ABSTRACT

A platform interface includes a platform, a hanger, and a ramping section. The platform defines a slot. The hanger has a body with a first end and a second end, a flange outwardly extending from the body and having a flange lip, and a gap extending between the first end and the flange lip. The ramping section has a hook configured to engage the flange such that the platform supports the ramping section via the flange. The gap is sized to prevent rotation of the hanger relative to the platform when the first end of the hanger is engaged with the slot and the hook engages the flange.

13 Claims, 10 Drawing Sheets

(56) References Cited

U.S. PATENT DOCUMENTS

| | | | |
|---|---|---|---|
| 6,389,629 B1 * | 5/2002 | Schouest | B60P 1/43 |
| | | | 119/849 |
| 7,950,094 B2 * | 5/2011 | Bailie | B65G 69/30 |
| | | | 14/69.5 |
| 8,347,439 B1 * | 1/2013 | Beilstein | B65G 69/30 |
| | | | 14/69.5 |
| 9,548,548 B2 * | 1/2017 | Potratz | H01R 9/2458 |
| 10,648,186 B2 | 5/2020 | Bailie | |
| 2014/0196225 A1 * | 7/2014 | Bunker, II | B65G 69/30 |
| | | | 14/69.5 |

\* cited by examiner

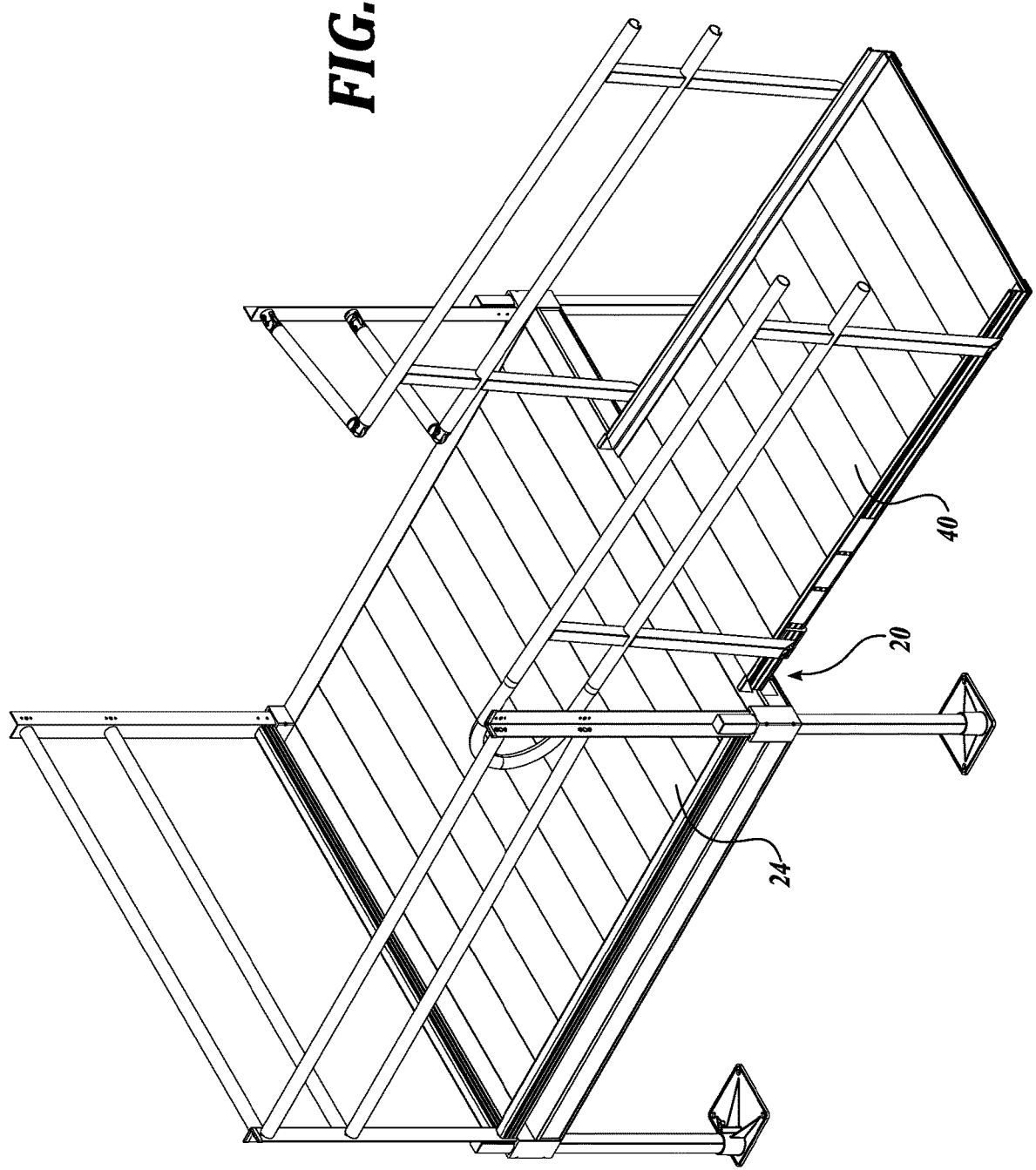

PLATFORM TRANSITION AND INTERFACE FOR THE SAME

CROSS REFERENCES TO RELATED APPLICATIONS

This application claims the benefit under 35 U.S.C. § 119(e) to provisional application No. 62/685,072, filed Jun. 14, 2018, and provisional application No. 62/722,114, filed Aug. 23, 2018, each of which is hereby incorporated by reference in its entirety.

BACKGROUND

Ramps and platforms are becoming increasingly common, due primarily to the recent passage of the Americans with Disabilities Act (ADA) requiring public buildings to be designed or modified to provide wheelchair access. These ramps and platforms assist those people confined to wheelchairs or who use walkers by providing a suitable pathway or ramp-way to the entrances of public and private buildings and stores, which may be at elevations above or below ground level.

Because each site may be generally different from other sites, some platform assemblies are modular in construction, and designed to minimize the cost and assembly time of at-site assembly. Platform assemblies generally include deck surfaces, support posts, and handrails. These modular assemblies can be configured to provide ramping and horizontal deck surfaces to provide access, for example, if a user needs to travel from elevation A to elevation B, but is not able to traverse stairs or a steep slope to get there.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a platform interface that includes a platform, a hanger, and a ramping section. The platform has a platform tread segment and a platform lip that at least partially define a slot. The hanger has a body with a first end and a second end, a flange outwardly extending from the body and having a flange lip with an outer flange surface, and a gap extending between the first end and the flange lip, the first end having a first end lip projecting toward the flange, the hanger being selectively mountable to the platform via engagement of the first end lip with the platform lip. The ramping section has a first end and a second end defining a ramp tread segment therebetween, the ramping section further including a hook extending from the first end, the hook having an inner hook surface configured to engage the outer flange surface such that the platform supports the ramping section via the flange lip. The gap extends between the first end of the hanger and the flange lip is sized to prevent rotation of the hanger relative to the platform when both the first end of the hanger is engaged with the slot and the inner hook surface engages the outer flange surface.

In some embodiments, the outer flange surface has a radius of curvature that is less than a radius of curvature of the inner hook surface.

In some embodiments, the radius of curvature of the outer flange surface may be 0.1%-5% smaller than the radius of curvature of the inner hook surface.

In some embodiments, the radius of curvature of the outer flange surface may extend between about 180 degrees and about 350 degrees about a central axis of the flange lip, for example 250 degrees to 350 degrees about the central axis.

In some embodiments, the first end of the hanger has an inner radius of curvature that varies.

In some embodiments, the inner hook surface is configured to engage the outer flange surface when the ramp tread segment forms a plurality of angles relative to the platform tread segment. In some embodiments, the plurality of angles may include a first angle that is less than 180 degrees.

In some embodiments, an end of the hook contacts the flange when the ramp tread segment is parallel to the platform tread segment.

In some embodiments, when the hook engages the flange lip, the hook and the platform lip form a gap therebetween that is less than or equal to 0.25 inches wide.

In some embodiments, the ramp is a ground transition adaptor.

In some embodiments, the platform lip and the hook occupy at least 90% of the gap between the first end of the hanger and the flange lip.

In some embodiments, the first end and the flange of the hanger form a U-shape. In some embodiments, the hanger comprises a recess adjacent the flange, the recess being configured to receive a portion of the ramp when the hook engages the flange lip.

In one aspect, a platform system includes a platform, a ramping section, and a hanger. The platform includes a platform tread segment, a support segment extending from the platform tread segment, a platform lip extending from the platform tread segment and having a protrusion extending by a maximum protrusion distance toward the support segment, and a slot at least partially defined by the platform tread segment and the protrusion, the slot having a slot depth. The ramping section includes a ramp tread segment terminating in a hook, the hook having a hook thickness and an inner radius of curvature. The hanger includes a first end having a first end thickness and a first end insertion thickness, the first end insertion thickness exceeding the slot depth of the platform, a flange having a flange lip with an outer radius of curvature that is less than or equal to the inner radius of curvature of the hook, and a gap between the first end and the flange, the gap having a gap width that is less than a sum of a) the hook thickness and b) the maximum protrusion distance of the protrusion.

In some embodiments, the first end insertion thickness of the hanger is a sum of the first end thickness and a first end protrusion distance.

In some embodiments, the slot depth is less than or equal to 0.2 inches and the first end insertion thickness is at least 0.2 inches.

In some embodiments, the gap width is less than or equal to 0.3 inches.

In one aspect, a method of assembling a platform system having a platform, a hanger, and a ramping section includes inserting a first end of a hanger at least partially into a slot of the platform while the hanger is at a first angle relative to the platform, rotating the hanger into a second angle relative to the platform such that the first end of the hanger engages the slot, hooking a ramp hook on a flange lip of the hanger while the ramp hook is at a first angle relative to the hanger such that the ramp hook engages a first area of the flange lip, and rotating the ramp hook into a second angle relative to the hanger such that the ramp hook engages a second area of the flange lip, wherein the hanger cannot be disengaged from the slot and the ramp hook cannot be disengaged from the flange lip when both a) the first end of the hanger is inserted into the slot of the platform and rotated into the second angle relative to the platform and b) the ramp hook is engaged with the flange lip at the second angle relative to the hanger.

In some embodiments, as a result of rotating the hanger into the second angle relative to the platform, a bottom surface of a hanger contacts a bottom segment of the platform.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 7 is one example of a ramp and platform assembly.

DETAILED DESCRIPTION

Embodiments of the present disclosure are directed to platform assemblies and aspects of platform assemblies that facilitate transition from a first elevation to a second elevation (e.g., another platform elevation or a ground elevation). Generally, embodiments described herein relate to modular platform assemblies that may include one or more platform sections, ramping sections, deck surfaces, support posts, and handrails.

The detailed description is set forth below in connection with the appended drawings. Where like numerals reference like elements, it is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

As described in greater detail below, many of the components of the platform assembly may be formed from metal, for example, from extruded aluminum. Extruded aluminum construction generally reduces parts in the overall system, thereby reducing manufacturing and assembly costs, as well as operational noise generated by rattling part couplings. Moreover, extruded aluminum parts can be designed to achieve the same strength and stiffness requirements as steel construction, while having reduced weight over steel parts or parts made from other materials, allowing for improved ease of assembly and optimized part design.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

In the following description, orientation language, such as downwardly, top, bottom, upper, etc., may be used to describe certain parts and the interfaces between different parts. Such orientation language is meant to provide guidance to the reader and is not meant to be limiting. The term "about," "approximately," etc., means plus or minus 5% of the stated value.

Figure 1:
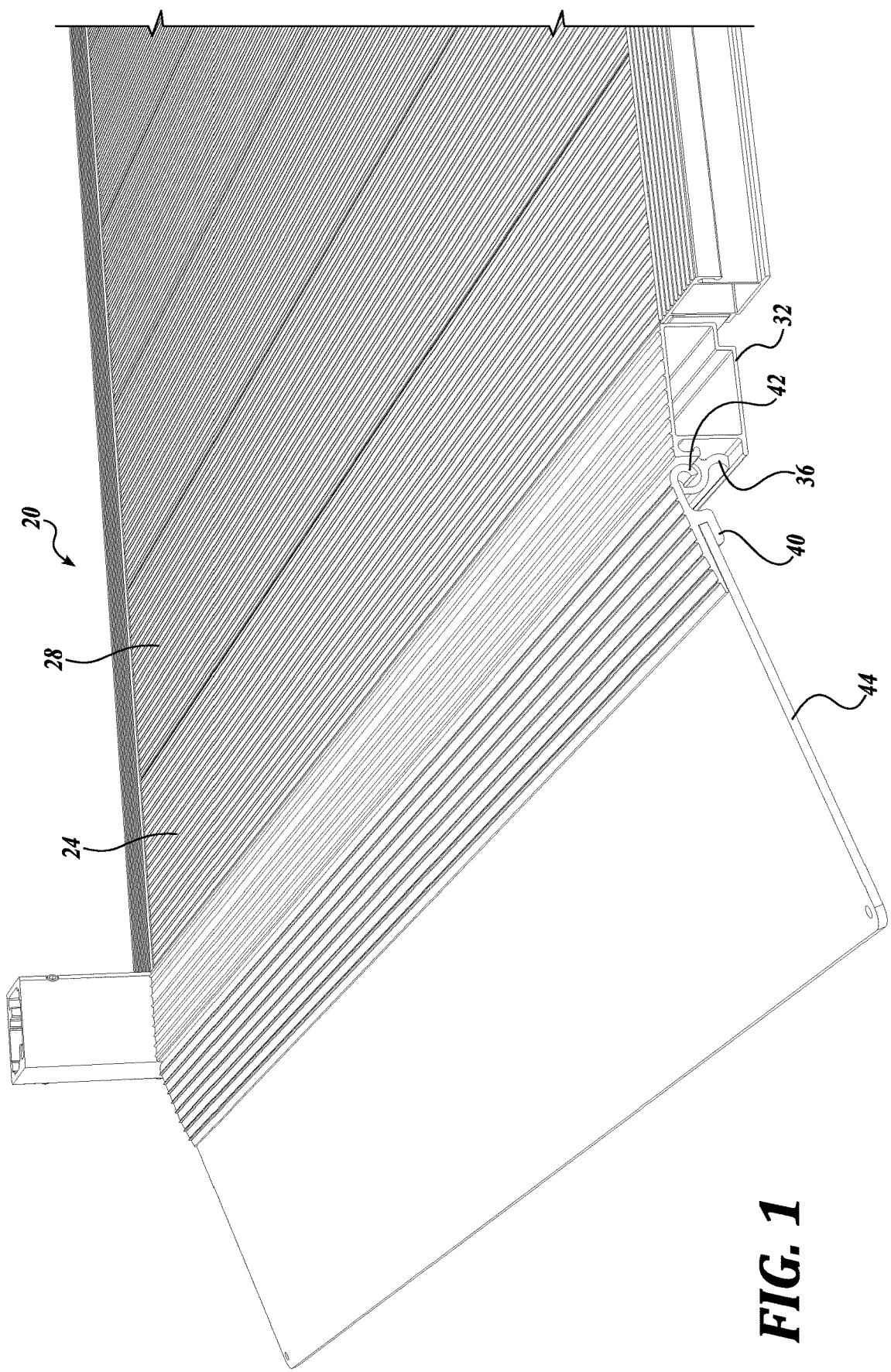
FIG. 1 is a partial isometric view of one example of a platform assembly.
Figure 2:
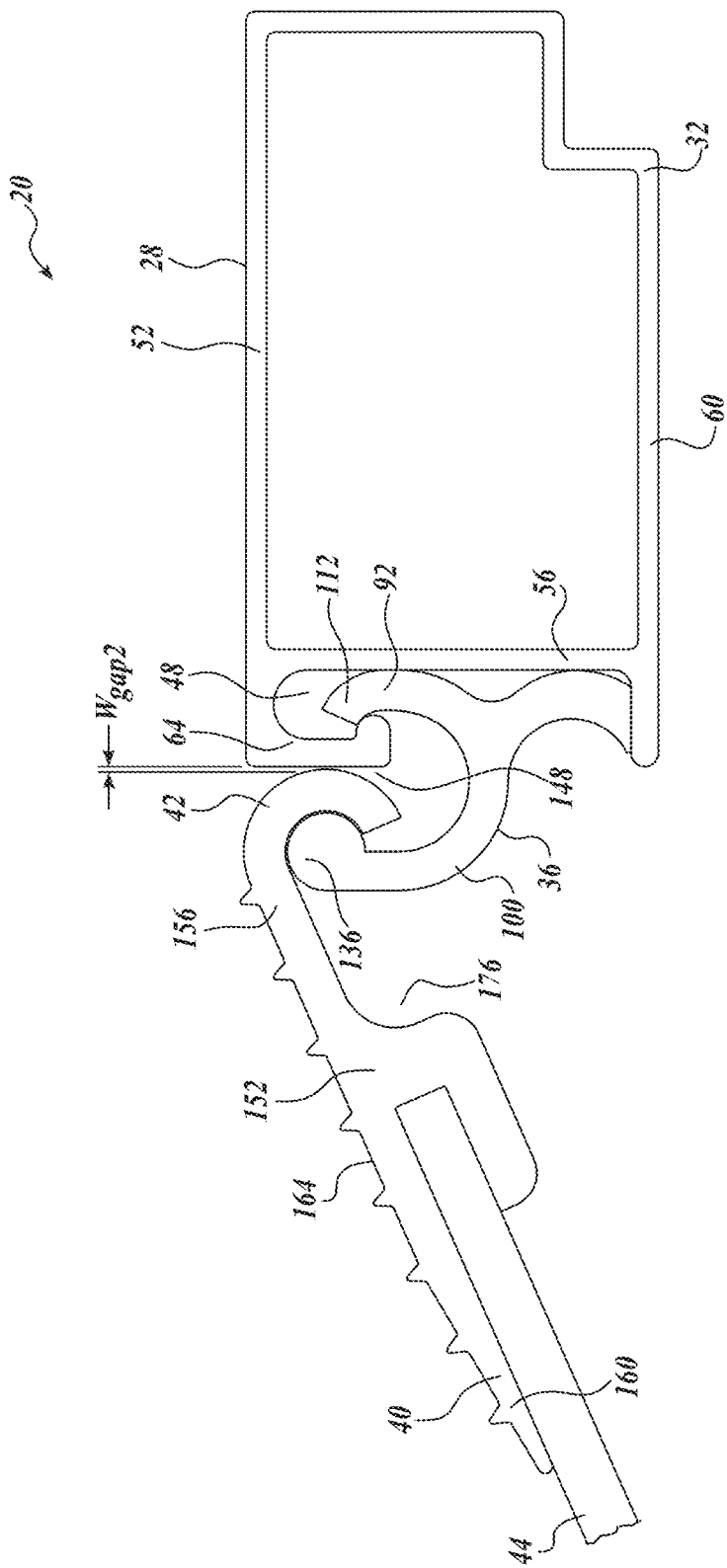
FIG. 2 is a side view of a portion of the assembly of FIG. 1.

FIGS. 1-2 illustrate an exemplary modular platform assembly 20 formed in accordance with aspects of the present disclosure. In the embodiment shown, the assembly 20 includes a platform 24 having a platform tread surface 28, upon which individuals can stand or sit. The tread surface 28 may have one or more surface characteristics to enhance traction, such as knurling, ridges, surface coating, etc. An end section 32 of platform 24 is configured to receive a hanger 36 having a flange that is configured to be engaged by a ramping section 40 (particularly, by a ramp hook 42).

Assemblies in accordance with embodiments of the present disclosure are configured to enable a smooth transition between the end of a platform and another surface, such as a ground surface or another surface such as another platform. Because the platform generally has a thickness, there may be a discontinuous step or bump between the end of the platform and another surface, such as a ground surface or another platform.

In the illustrated embodiment, the platform 24 is manufactured from a plurality of adjacent platform sections 28, which are joined by welding or by another suitable joining method to provide a secure and substantially contiguous platform tread surface 28. However, a platform 24 manufactured in a single piece is also within the scope of the present disclosure. The end section 32 of the platform 24 may be a discrete platform section joined to the platform 24 or may be integrally manufactured with the platform 24.

In some embodiments, the ramping section 40 may be an adaptor, which may be configured to join with an extension section 44, such as to provide a gradual transition from a first elevation to a second elevation. Each platform 24 generally provides a stable base for supporting an individual, e.g., a wheelchaired individual, at an elevation A, which is generally elevated with respect to the ground and may correspond with the elevation of a door, a deck, a landing, or any other elevated place. In use, the platform 24 may have a substantially horizontal orientation relative to the ground, but could potentially have an incline relative to the ground, such as, in a range of 0-15 degrees, e.g., about 5 degrees, about 10 degrees, about 15 degrees, or any other incline in that range. Some or all of the components shown in FIGS. 1-2 may be assembled as an assembly 20 (as shown), but may also be sold or shipped as a disassembled platform system.

As shown in FIG. 1, a plurality of platforms 24 may be arranged within or upon a modular assembly 20 such as described in U.S. patent application Ser. No. 15/797,699, which is hereby incorporated by reference in its entirety.

The following discussion predominantly concerns the end section 32 of platform 24, the hanger 36, and the ramping section 40, which together provide a secure and adjustable joint that enables the end section 32 to join the ramping section 40 at a plurality of angles relative to the ramping section 40 to accommodate a variety of installation conditions and elevation changes. This structure may be useful to transition between a first elevation A and a second elevation B. Advantageously, the assembly 20 can be assembled and disassembled without any tools according to the method discussed below. Further, the end section 32, the hanger 36, and the ramping section 40 are cooperatively sized such that only a small gap is formed between the ramping section 40 and the end section 32. For example, the gap may be less than 0.25 inches to meet or exceed ADA requirement regarding gap size.

Referring now to the exemplary end section 32 of FIGS. 3-4, at least one side includes an integrally formed platform slot 48 designed to interface with the hanger 36 (shown in FIGS. 1-2, 6), which is described in more detail below. The end section 32 has a platform tread segment 52 that forms at least part of the platform tread surface 28, as described above. The platform tread segment 52 may define a portion of an upper end of the platform slot 48. An inner side of the platform slot 48 may be at least partially defined by a support segment 56 that extends from the platform tread segment 52. The support segment 56 may be substantially parallel perpendicular to the platform tread segment 52. In some embodiments, the support segment 56 may extend between the platform tread segment 52 and a bottom segment 60, e.g., from the platform tread segment 52 to the bottom segment 60. The bottom segment 60 may extend substantially parallel to the platform tread segment 52, and a portion of the bottom segment 60 may define a lower end of the platform slot 48. In some embodiments, the bottom segment 60 may be the bottom-most segment of the end section 32.

A platform lip 64 extends away from the top surface of the platform tread segment 52, e.g., downwardly away from the top surface in the illustrated embodiment. At least a portion of the platform lip 64 may extend substantially perpendicular to the platform tread segment 52 (as in FIG. 3), which may be downward towards the ground in some applications. In some embodiments, a first portion of the platform lip 64 may extend obliquely away from the platform tread segment 52, but may still extend downward toward the ground.

The platform slot 48 is generally sized to receive a top end of the hanger 36 (e.g., a first end), described below, and for that reason includes a slot opening 72 allowing access into the internal region of the platform slot 48. The platform slot 48 may extend along all or part of the width of the end section 32. The end section 32 has a height Hplatform that limits a height Hslot of the slot. In some non-limiting embodiments, the platform height Hplatform may range from about 1.0 inch to about 6.0 inches, e.g., about 1.25 inches, about 1.50 inches, about 1.75 inches, about 2.0 inches, or any other value in that range. Depending on the platform height Hplatform, in some non-limiting embodiments, the slot height Hslot may also range from about 1.0 inch to about 6.0 inches, e.g., about 1.25 inches, about 1.30 inches, about 1.40 inches, about 1.50 inches, about 1.75 inches, about 2.0 inches, or any other value in that range. In some non-limiting embodiments, the slot opening 72 may have a height Hopening that may range from about 0.5 inch to about 5.0 inches, e.g., about 0.6125 inches, about 0.75 inches, about 0.875 inches, about 1.0 inches, about 1.50 inches, about 2.0 inches, or any other value in that range.

In some non-limiting embodiments, the platform lip 64 may extend away from the platform tread surface 28 by a height Hlip of about 0.25 inches to about 5.0 inches, e.g., about 0.50 inches, about 0.525 inches, about 0.575 inches, about 1.0 inches, or any other value in that range. In some non-limiting embodiments, to facilitate engagement with the hanger 36, the platform lip 64 may include a protrusion 76 that extends inwardly toward the support segment 56 by a maximum protrusion distance Dprot. (relative to an outermost surface of the platform lip 64) of about 0.1 inches to about 1.0 inches, e.g., about 0.15 inches, about 0.175 inches, about 0.1875 inches, about 0.2 inches, or any other value in that range. In some non-limiting embodiments, an end 80 of the protrusion 76 may have a radius of curvature R1 of about 0.05 inches to about 0.2 inches, e.g., about 0.06 inches, about 0.0625 inches, about 0.07 inches, about 0.08 inches, about 0.09 inches, about 0.1 inches, or any other value in that range.

A slot passage 84—the narrowest part of the platform slot 48—extends between the protrusion 76 and the support segment 56. The slot passage 48 has a slot depth Dslot that corresponds with the narrowest point between the platform lip 64 and the support segment 56, e.g., in the embodiment of FIG. 3, the depth between the end 80 of the protrusion 76 and the closest point on the support segment 56. In some non-limiting embodiments, the slot depth Dslot may range from about 0.05 inches to about 0.5 inches, e.g., about 0.75 inches, about 0.1 inches, about 0.15 inches, about 0.1645 inches, about 0.175 inches, about 0.2 inches, or any other value in that range. In relation to the hanger 36, the slot depth Dslot may be at least as wide as a thickness of a top end Ttop of the hanger 36 (described below), but narrower than a top end insertion thickness Tinsertion of the hanger 36 (also described below).

Figure 3:
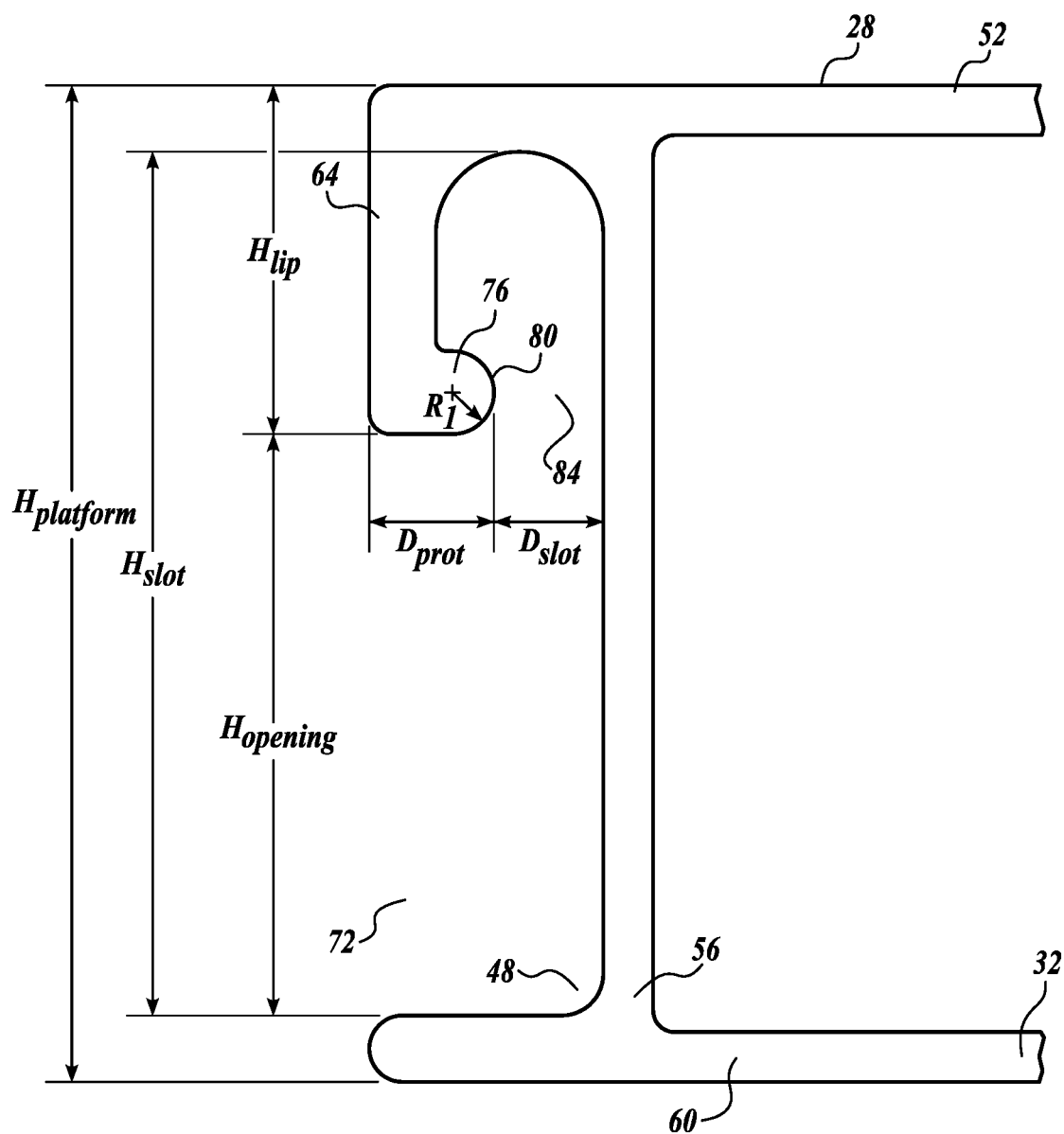
FIG. 3 is a partial side view of an end section of a platform of the assembly of FIG. 1.
Figure 4:
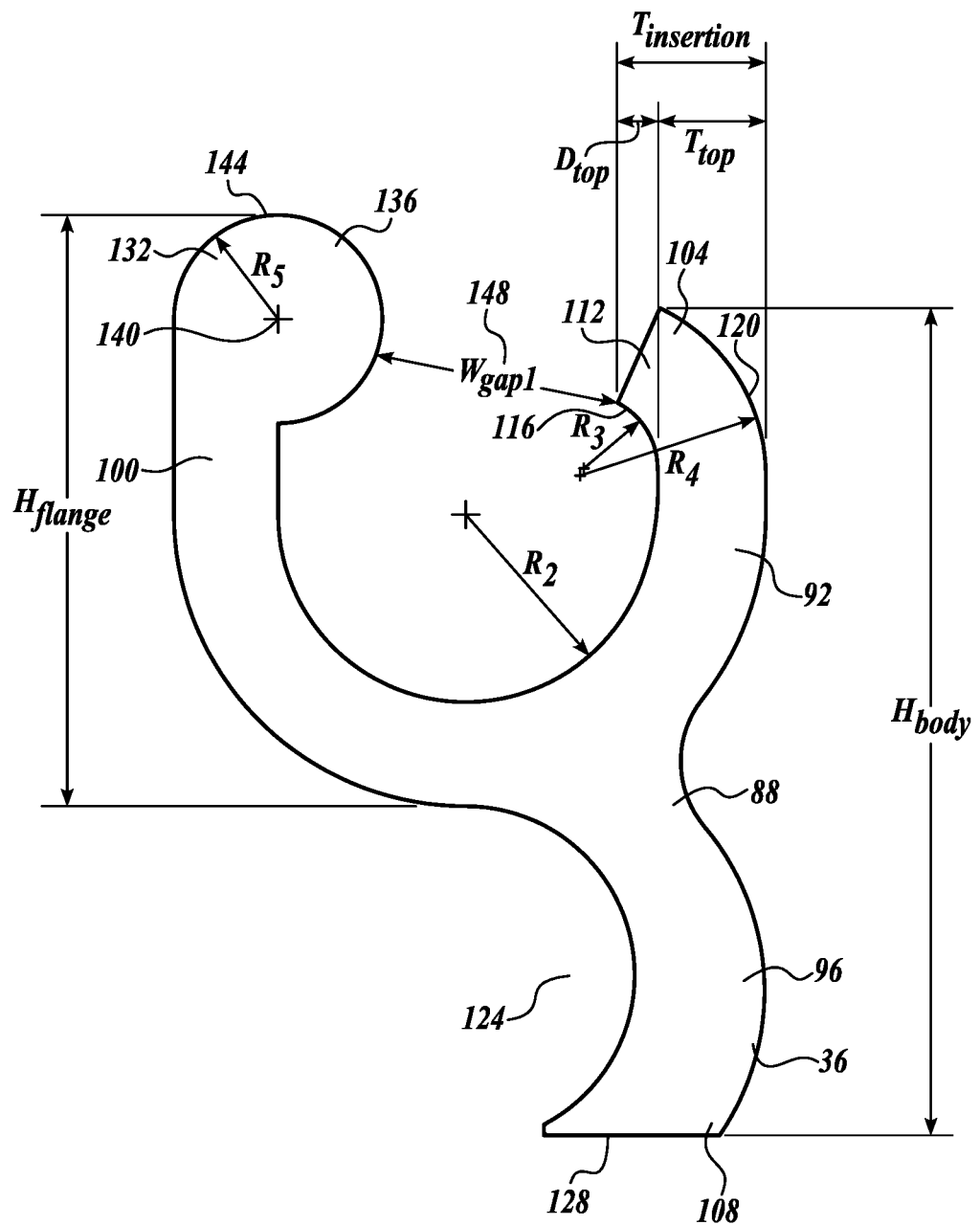
FIG. 4 is a side view of a hanger of the assembly of FIG. 1.

FIG. 4 shows the exemplary hanger 36 of FIGS. 1-2, which interfaces with the platform slot 48 (see FIG. 3) to provide a selectively mountable support for the ramping section 40 (described below; see also FIGS. 1-2). The hanger 36 generally includes a hanger body 88 having a top portion 92 (a first portion) and a bottom portion 96 (a second portion), and a hanger flange 100 extending outwardly from the hanger body 88. The top portion 92 has a top end 104 (a first end) and the bottom portion 96 (a second end) has a bottom end 108. Together, the hanger body 88 and the hanger flange 100 in the illustrated embodiment form a wishbone shape or a Y-shape having an opening 148 at the top (i.e., there is a gap between the top portion 92 and the hanger flange 100). In other embodiments, the hanger 36 may have a different overall shape having an opening at the top. In some non-limiting embodiments, the top portion 92 and the hanger flange 100 together form a U-shape with an internal radius R2 of about 0.1 inches to about 0.75 inches, e.g., about 0.25 inches, about 0.3 inches, about 0.4 inches, about 0.5 inches, or any other value in between. In some non-limiting embodiments, the internal radius R2 may change, e.g., may change more or less continuously. In some embodiments, the U-shape may have a plurality of different radii of curvature, with more than one center. In some embodiments the top portion 92 and the hanger flange 100 may form a different shape, for example an open polygonal shape such as a pentagon (or hexagon, octagon, etc.) with a gap between two adjacent sides.

Referring to FIG. 4 along with FIG. 3, the hanger body 88 has an overall height Hbody that is less than the slot height Hslot of the end section 32 (see FIG. 3), to enable the hanger body 88 to fit within the platform slot 48. In some non-limiting embodiments, Hbody may range from about 0.75 inches to about 6.0 inches, e.g., about 1.00 inches, about 1.10 inches, about 1.25 inches, about 1.50 inches, about 1.75 inches, about 2.0 inches, or any other value in that range. The top portion 92 has a thickness Ttop that is less than the slot depth Dslot of the end section 32 (see FIG. 3), such that the top portion 92 may fit within the platform slot 48 (if assembled according to the method discussed below), in particular within the slot passage 84. In some non-limiting embodiments, Ttop may range from about 0.05 inches to about 0.50 inches, e.g., about 0.075 inches, about 0.1 inches, about 0.15 inches, about 0.175 inches, about 0.2 inches, or any other value in that range. Near the top end 104, the body 88 has a top end lip 112 that projects toward the hanger flange 100 by a top end protrusion distance Dtop, which can be considered the added "thickness" of the top portion 92, considering the top end lip 112. In some non-limiting embodiments, Dtop may range from about 0.01 inches to about 0.50 inches, e.g., about 0.04 inches, about 0.05 inches, about 0.075 inches, about 0.1 inches, about 0.5 inches, or any other value in that range. The sum of the thickness Ttop and the protrusion distance Dtop is equal to a top end insertion thickness Tinsertion, which can be thought of as the "thickness" of the profile presented by the top end 104 of the hanger 36 to the slot passage 84 if the outer surfaces of the top and bottom portions 92, 96 of the hanger body 88 are in contact with the inner surface of the platform slot 48. The insertion thickness Tinsertion exceeds the slot depth Dslot such that the top end 104 of the hanger 36 cannot simply translate through the slot passage 84; rather, the top end 104 of the hanger 36 must be rotated, or rotated and translated, through the slot passage 84. Stated in formulaic terms:

$$D\text{slot} < T\text{insertion} = T\text{top} + D\text{top}$$

The top end insertion thickness Tinsertion may range from about 0.05 inches to about 1.0 inches, e.g., about 0.2 inches, depending on the corresponding slot depth Dslot.

Still referring to FIG. 4, the top end lip 112 near the top end 104 has an inner surface 116 that is at least partially defined by a radius of curvature R3. In some non-limiting embodiments, R3 may range from about 0.05 inches to about 1.0 inches, e.g., about 0.1 inches or any other value in that range. The inner surface 116 is configured to engage the platform lip 64, in particular the protrusion 76, e.g., a side portion and an upper portion of the protrusion 76. Separate from the radius of curvature R3 that defines at least a portion of an inner surface 116, the top portion 92 of the hanger body 88 may have another radius of curvature R4 that defines at least a portion of an outer surface 120. In some non-limiting embodiments, R4 may range from about 0.05 inches to about 1.0 inches, e.g., about 0.25 inches, about 0.4 inches or any other value in that range. In some embodiments, R3 and/or R4 may vary, e.g., may change continuously. In some non-limiting embodiments, R3 and R4 have different centers. In some embodiments, the top portion 92 may have additional radii of curvature that define at least a portion of the inner surface 116 and/or the outer surface 120. (See, for example, R3 and R4 in the illustrated embodiment of FIG. 4.) Although the outer surface 120 is curved in the embodiment of FIG. 4, it need not be curved in some embodiments; however, a curved outer surface 120 advantageously enables smooth engagement with one or more surfaces of the platform slot 48 and reduces friction created between the outer surface 120 and one or more surfaces of the platform slot 48.

The bottom portion 96 of the hanger 36 has a curved shape, which advantageously defines part of a space 124 below the hanger flange 100. This space 124 is sized to reduce interference with a portion of the ramping section 40, as discussed below with reference to FIG. 6D. The bottom portion 96 terminates in a bottom surface 128, which may optionally be supported by the bottom segment 60 of the end section 32 when in use, to further prevent the hanger 36 from falling out of the platform slot 48. In some embodiments, the bottom surface 128 of the hanger 36 need not interface with the bottom segment 60 of the end section 32, as the top portion 92 of the hanger 36 may be retained within the platform slot 48 by the engagement of the top end lip 112 with the platform lip 64.

Referring still to FIG. 4, now along with FIGS. 1-2, the hanger 36 is configured to support the ramping section 40. Particularly, the hanger flange 100 is configured to support the ramping section 40, and extends away from the hanger body 88 and curves upward in approximately the same general direction as the top portion 92 by a height Hflange. In some non-limiting embodiments, Hflange may range from about 0.25 inches to about 1.0 inches, e.g., about 0.50 inches, 0.65 inches, 0.66 inches, or any other value in that range. At a distal end 132 of the hanger flange 100 is a flange lip 136 configured to be engaged by the ramping section 40 when the ramping section 40 forms a plurality of angles relative to end section 32 (e.g., when a tread surface of the ramping section 40 forms a plurality of angles with the platform tread surface 28). In the embodiment of FIG. 4, the flange lip 136 has partially circular cross sectional shape that is constant along a central axis 140, which may correspond to an extrusion axis. In some embodiments, the flange lip 136 may have a non-circular cross sectional shape, for example a polygonal cross section, a finned cross section, or another cross section. In this embodiment, an outer surface 144 of the flange lip 136 has a radius of curvature R5 that extends about 270 degrees about the central axis 140. In some non-limiting embodiments, the radius of curvature R5 may extend by a different amount about the central axis 140, e.g., about 180 degrees to about 350 degrees, e.g., between about 250 degrees and about 350 degrees. In some non-limiting embodiments, radius of curvature R5 may range from about 0.05 inches to about 0.50 inches, e.g., about 0.14 inches or any other value in that range. In particular, R5 is less than an internal radius of curvature of the ramping section 40 (particularly, the ramp hook 42), described below, e.g., about 0.05% to about 20% smaller.

To enable the ramping section 40 to engage the flange lip 136 while the hanger 36 is mounted within the platform slot 48, a hanger gap 148 extends between the top portion 92 and the flange lip 136. The gap 148 has a width Wgap1 that is the narrowest measure of the hanger gap 148, i.e., the distance from a) a point on the top portion 92 of the hanger body 88 that is nearest the flange lip 136 to b) the nearest point on the flange lip 136. The gap width Wgap1 is less than a sum of a) the thickness of the ramp hook Thook (described below with reference to FIG. 5) and b) the maximum protrusion distance of the platform lip Dmax. Stated in formulaic terms:

$$W\text{gap1} < T\text{hook} + D\text{max}.$$

This upper limit on the gap width Wgap1 allows the hanger 36 to be mounted within the platform slot 48 while the ramping section 40 engages the flange lip 136, but does not allow the hanger gap 148 to be wide enough to allow either the platform lip 64 or the ramping section 40 to be disengaged from the hanger 36 without first rotating the ramping section 40 out of an engagement position, as described below. The gap width Wgap1 may range from about 0.2 inches to about 1.5 inches, e.g., about 0.3 inches, 0.5 inches about 1.0 inches, or any other value in that range, again depending on the thickness of the ramp hook Thook and the maximum protrusion distance of the platform lip Dmax.

Figure 5:
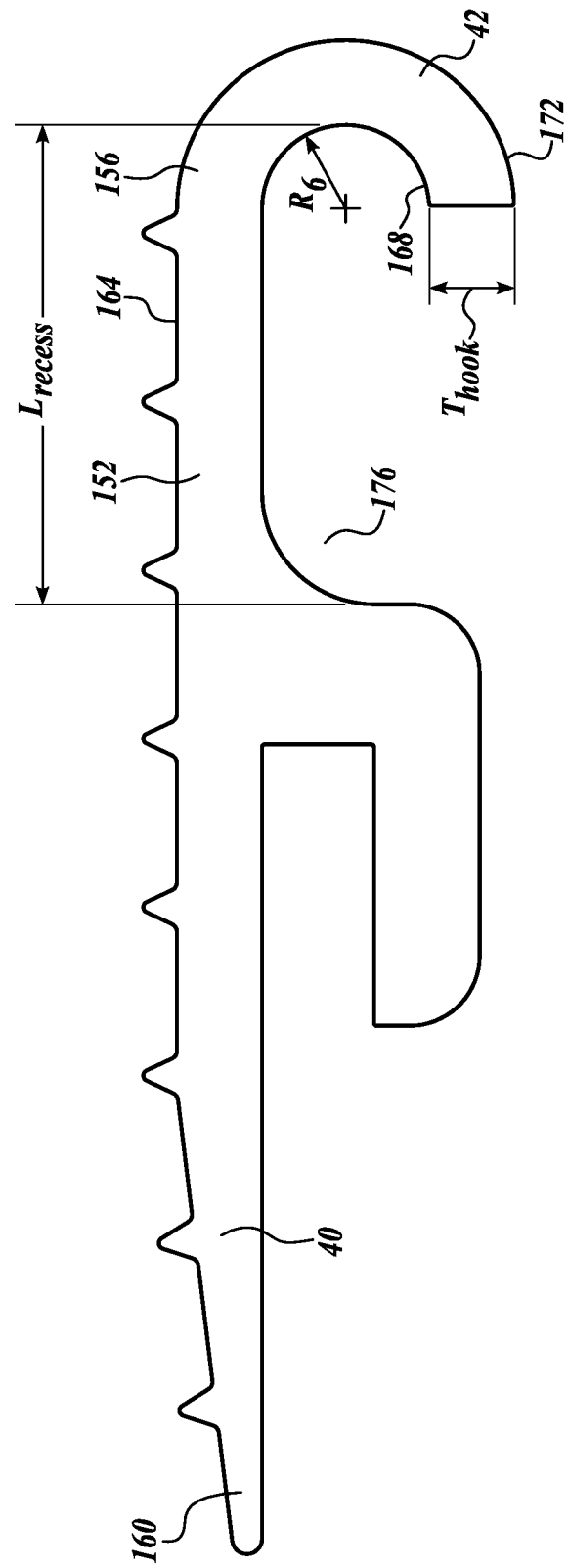
FIG. 5 is a side view of a ramping section of the assembly of FIG. 1.

Referring now to FIG. 5, the ramping section 40 of FIGS. 1-2 has a ramp tread segment 152 with a first end 156 and a second end 160 that together define a ramp tread surface 164 on a top side thereof. Like the platform tread surface 28 of FIG. 3, the ramp tread surface 164 provides a stable base for supporting an individual, e.g., a wheelchaired individual. In use, the ramping section 40 may transition between elevation A (e.g., an elevation of the platform) and elevation B. As such, the ramp tread surface 164 may have an incline relative to a ground surface or another surface, e.g., in a range of about 0 to about 15 degrees, about 5 degrees, about 10 degrees, about 15 degrees, or any other incline in that range. To enhance traction and safety, the ramp tread surface 164 may have one or more surface characteristics such as knurling, ridges, surface coating, etc. Like the end section 32, the ramping section 40 may be an extruded piece having a consistent shape along an extrusion direction. In some embodiments, the ramping section 40 may be an adaptor, which may be configured to join with an extending section (e.g., the extension section 44 of FIGS. 1-2), such as to provide a gradual transition from elevation A to elevation B. In some embodiments, the ramping section 40 may be sized such that it does not interfere with another surface (e.g., a ground surface) during assembly, for example as assembly step shown in FIG. 6D.

Extending from the first end 156 of the ramping section 40 is the ramp hook 42 having an inner surface 168 and an outer surface 172. The inner surface 168 is configured to engage the outer surface 144 of the flange lip 136 (see FIG. 4) at a plurality of angles (e.g., when the ramp tread surface 164 forms a plurality of angles relative to the platform tread surface 28). Accordingly, the inner surface 168 of the ramp hook 42 and the outer surface 144 of the flange lip 136 may have complementary shapes. For example, the inner surface 168 of the ramp hook 42 may have a radius of curvature R6 that is greater than the radius of curvature R5 of the flange lip 136 (see FIG. 4). In the embodiment of FIG. 5, the inner surface 168 has a radius of curvature R6 of about 0.15 inch-about 5% greater than the radius of curvature R5 of the flange lip 136 of FIG. 4. In other embodiments, the inner surface 168 has a radius of curvature R6 that is about 0.1% to about 20% greater than the radius of curvature R5 of the flange lip 136 Although the inner surface 168 of the ramp hook 42 and the outer surface 144 of the flange lip 136 preferably have a similar or same shape to provide smooth engagement and adjustment, the inner surface 168 of the ramp hook 42 need not necessarily have a similar or same shape as the outer surface 144 of the flange lip 136, so long as the flange lip 136 may be engaged by the ramp hook 42.

The ramp hook 42 has a thickness Thook that influences how it interacts with the hanger 36 and the end section 32. In some non-limiting embodiments, Thook may range from about 0.1 inches to about 0.75 inches, e.g., about 0.15 inches, about 0.25 inches, about 0.5 inches, or any other value in that range. As described above, Thook should be sufficiently large such that the sum of Thook and the protrusion distance Dmax of the platform lip 64 exceed the width Wgap1 of the hanger gap 148. Stated in formulaic terms:

$$Thook > Wgap1 - Dmax.$$

The ramp hook 42 and the ramp tread segment 152 of the ramping section 40 partially define a ramp recess 176 that is sized to receive at least a portion of the hanger flange 100 when the ramp hook 42 engages the flange lip 136 and when the ramping section 40 has a particular angular orientation, as discussed below. As such, the ramp recess 176 may have a length Lrecess that exceeds the flange height Waage of the hanger 36.

Referring again to the assembly of FIG. 2, when the hanger 36 is mounted within the platform slot 48 and the ramp hook 42 engages the flange lip 136, the assembly 20 forms an adjustable joint (e.g., a self-adjusting joint) between the end section 32 and the ramping section 40. This structure may be useful to transition between a first elevation A and a second elevation B. Advantageously, the assembly 20 can be assembled and disassembled without any tools according to the method discussed below. Further, the end section 32, the hanger 36, and the ramping section 40 are cooperatively sized and shaped such that when the hanger 36 is engaged with the end section 32 and the ramping section 40 is engaged with the hanger 36, the platform lip 64 and the ramp hook 42 substantially occupy the space of the hanger gap 148. For example, the platform lip 64 and the ramp hook 42 may occupy about 75% to about 99.9% of the hanger gap 148 (and gap width Wgap1), e.g., about 80%, about 90%, about 95%, about 99%, or any other value in that range, for example, to meet or exceed ADA requirements regarding gap size. In some non-limiting embodiments, a remaining gap width Wgap2 formed within the hanger gap 148 between the ramp hook 42 and the platform lip 64 may range from about 0.01 inches to about 0.5 inches, e.g., about 0.25 inches, about 0.1 inches, about 0.2 inches or less, or any other value in that range. Consequently, the hanger gap 148 is sized to prevent rotation of the hanger 36 relative to the end section 32 when both the top portion 92 of the hanger 36 is engaged with the platform lip 64 and the ramp hook 42 engages the flange lip 136. This is because the ramp hook 42 and the platform lip 64 substantially restrict movement of the hanger 36. In some embodiments, the hanger gap 148 is sized to prevent chatter between the end section 32, hanger 36, and ramping section 40.

Referring now to FIGS. 6A-F, a method for assembling the platform and hanger of FIGS. 1-3 will be described.

Figure 6A:
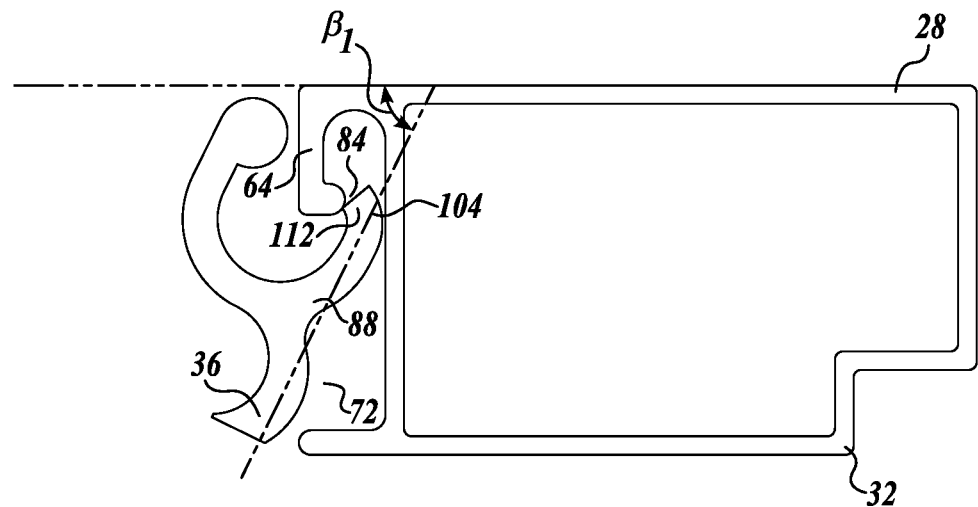
FIGS. 6A, 6B, 6C, 6D, 6E, 6F are partial side views showing an exemplary method of assembling the platform end section, hanger, and ramping section of the assembly of FIG. 1.

At a first step illustrated in FIG. 6A, the top end 104 of the hanger 36 is at least partially inserted into the platform slot 48 while the hanger 36 is at a first angle β1 relative to the end section 32. The first angle β1 may range from about 0 degrees to about 80 degrees. The angle β1 may be understood as an angle formed between the platform tread surface 28 and a hanger body 88. In the first step, the first angle β1 may be any angle that allows the top end 104 of the hanger 36 to enter the slot opening 72 but does not allow the top end 104 to traverse the slot passage 84. In other words, the first angle β1 may be any angle at which the top end 104 of the hanger 36 presents a profile that is larger than Dslot, e.g., an angle at which the top end 104 presents its insertion thickness Tinsertion, which exceeds the slot depth Dslot. Therefore, in order for the top end 104 of the hanger 36 to traverse the slot passage 84, it must first be rotated (in a subsequent step) relative to the platform slot 48 until the hanger 36 presents a profile that is smaller than Dslot (e.g., less than or equal to Ttop). At the first angle β1, the top end lip 112 may touch or engage a surface of the platform lip 64 (e.g., protrusion 76).

Figure 6B:
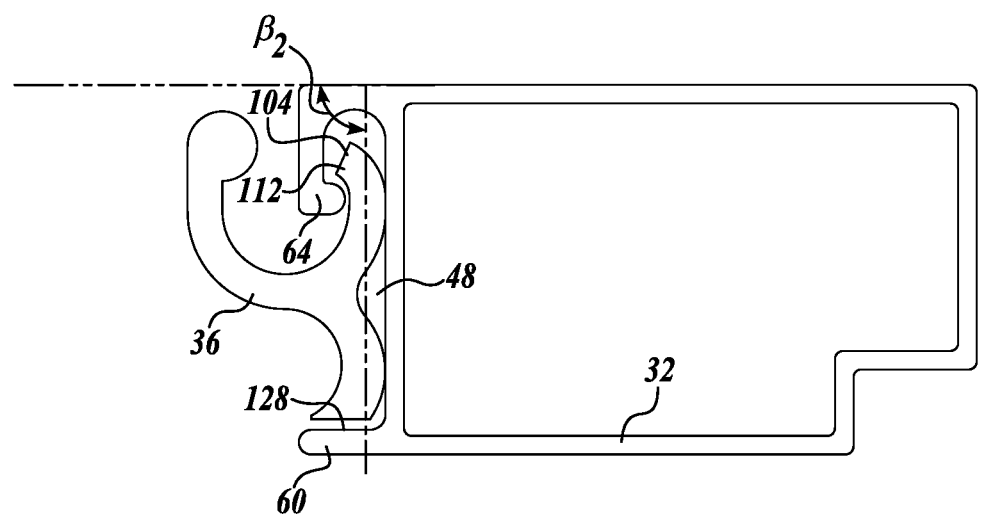
Figure 6C:
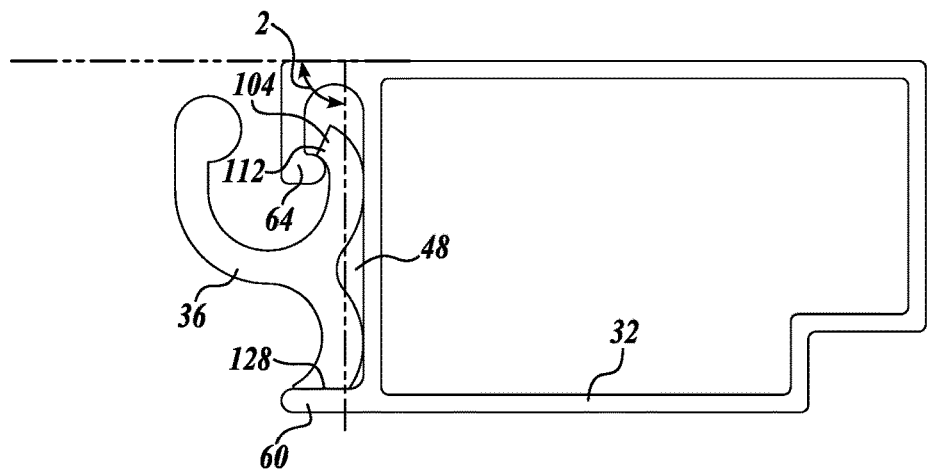

At a second step illustrated in FIGS. 6B-6C, the hanger 36 is rotated into a second angle β2 relative to the end section 32 such that the top end 104 of the hanger 36 can traverse the slot passage 84. In other words, the second angle β2 may be any angle at which the top end 104 of the hanger 36 presents a profile that is smaller than Dslot, e.g., an angle at which the top end 104 presents its top end thickness Ttop to the slot. The second angle β2 may range from about 80 degrees to about 90 degrees. Once rotated into the second angle β2, the hanger may be moved or allowed to move with gravity along (e.g., downward toward a ground surface) along the support segment 56 until the top end lip 112 engages the platform lip 64. Additionally, the second angle β2 causes the top end lip 112 to engage a greater surface area of the platform lip 64 than at the first angle β1. When this engagement occurs between the top end lip 112 and the platform lip 64, the hanger 36 cannot be translatably removed from the platform slot 48 without reverse rotation, e.g., back to the first angle β1. Simultaneously, the bottom surface 128 of the hanger 36 may contact the bottom segment 60 of the end section 32 such that the bottom segment 60 gravitationally supports the hanger 36, providing additional security against the hanger 36 falling out of the platform slot 48.

Figure 6D:
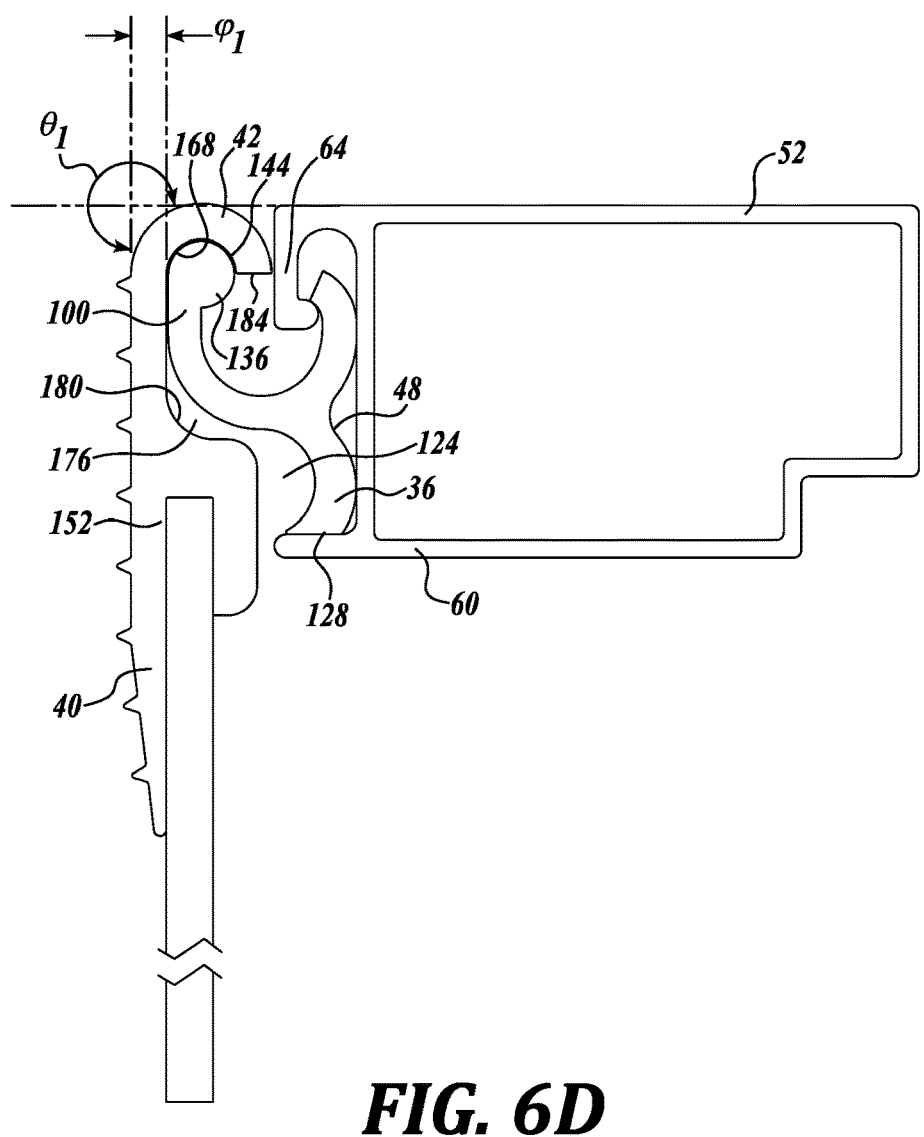

At a third step illustrated in FIG. 6D, after the hanger 36 is mounted within the platform slot 48, the ramping section 40 may engage the flange lip 136. Particularly, the inner surface 168 of the ramp hook 42 is engaged with the outer surface 144 of the flange lip 136 while the ramping section 40 is at a first angle φ1 relative to the hanger 36. The first angle φ1 may be understood as the angle formed between the ramp tread segment 152 and the hanger flange 100, and may be any angle that enables a) the inner surface 168 of the ramp hook 42 to engage the outer surface 144 of the flange lip 136, and b) the ramp recess 176 formed in the ramping section 40 to receive a portion of the hanger flange 100. The first angle φ1 may range from about 0 degrees (as in FIG. 6D, when the ramp tread segment 152 and the hanger flange are parallel) to about 30 degrees. When the ramping section 40 and the hanger flange 100 are at the first angle φ1, the ramp tread segment 152 may form another angle θ1 with the platform tread segment 52, which may range from about 240 degrees to about 270 degrees (as in FIG. 6D). The curvature of the ramp hook 42 and the reduced clearance within the hanger gap 148 (which is partially occupied by the platform lip 64) prevents the ramp hook 42 from engaging the flange lip 136 at any angle greater than first angle φ1. When the first angle φ1 is 0 degrees (as in FIG. 6D), the hanger flange 100 may contact an inner surface 180 of the ramp recess 176 and a portion of the ramping section 40 may reside within space 124 of the hanger 36. In some embodiments, the inner surface 168 of the ramp hook 42 may not engage the outer surface 144 of the flange lip 136 unless the ramping section 40 is at the first angle φ1 relative to the hanger flange 100. This aspect advantageously provides additional security: once engaged with the flange lip 136, the ramp hook 42 cannot be disengaged unless the ramping section 40 and the hanger flange 100 form an angle that is less than or equal to the first angle φ1. In some embodiments, the inner surface 168 of the ramp hook 42 may be engaged with the outer surface 144 of the flange lip 136 simply by allowing the ramp hook 42 to hang on the flange lip 136 such that gravity causes the ramp recess 176 to receive a portion of the hanger flange 100 and the space 124 to receive of a portion of the ramping section 40.

Figure 6E:
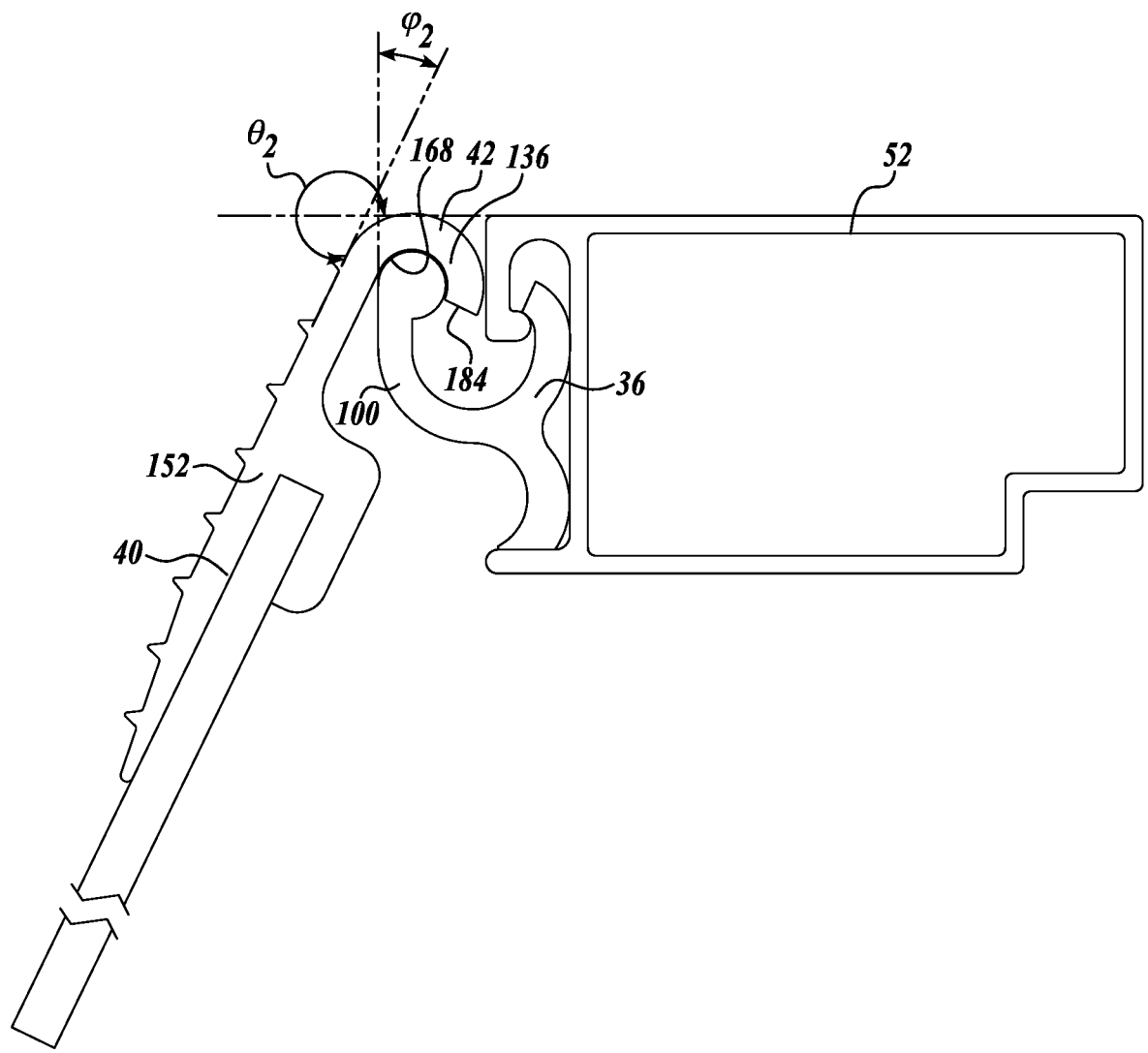
Figure 6F:
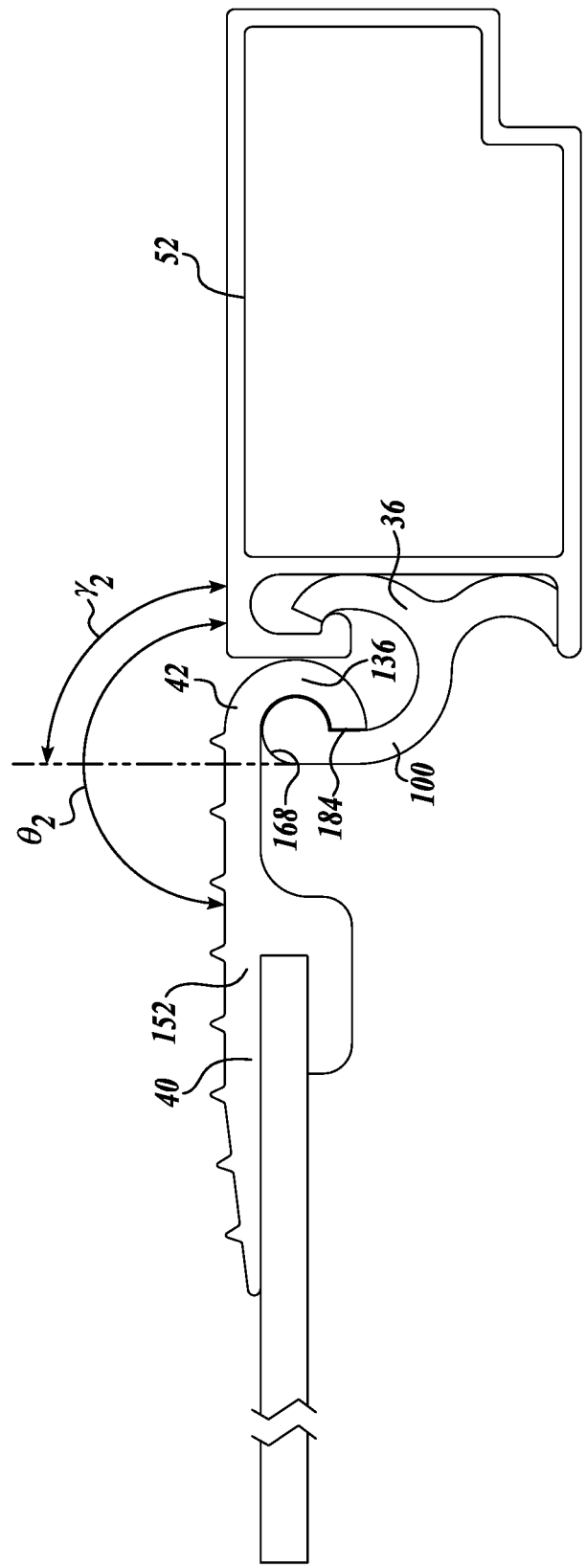

At a fourth step illustrated in FIG. 6E, the ramping section 40 is rotated to a second angle φ2 relative to the hanger 36 while the inner surface 168 of the ramp hook 42 is engaged with the flange lip 136. Like the first angle φ1, the second angle φ2 may also be understood as an angle formed between the ramp tread segment 152 and the hanger flange 100. The second angle φ2 may be any angle that enables the inner surface 168 of the ramp hook 42 to engage a larger area of the outer surface 144 of the flange lip 136 as compared to the first angle φ1. In some embodiments, the second angle φ2 may be great enough that the ramp hook 42 cannot be disengaged from the flange lip 136 without first rotating the ramp hook 42 back to the first angle φ1. The second angle φ2 may range from about 30 degrees to about 150 degrees, e.g., about 90 degrees, about 100 degrees, about 110 degrees, about 120 degrees, or any other value in that range. When the ramping section 40 and the hanger flange 100 are at the second angle φ2, the ramp tread segment 152 may form another angle θ2 with the platform tread segment 52, which may range from about 240 degrees to about 120 degrees, e.g., about 180 degrees (i.e., parallel). As shown in FIG. 6F, at some rotational point (e.g., when φ2 is equal to 90 degrees), an end 184 of the ramp hook 42 may contact the hanger flange 100 to prevent further rotation of the ramping section 40 relative to the hanger 36. This aspect may limit angle θ2 formed between the ramp tread segment 152 and the platform tread segment 52, e.g., to a maximum of about 150 degrees to about 210 degrees, e.g., about 180 degrees or any another angle in the range.

FIG. 7 illustrates another example of a modular platform assembly formed in accordance with aspects of the present disclosure. For clarity, elements that are the same or similar to elements of the platform assembly 20 of FIG. 1 are numbered the same. In the embodiment shown in FIG. 7, the platform assembly 20 includes a decking system including a platform 24, a handrail system configured to couple with the decking system, a support system configured to couple with the decking system and provide support to the decking system, a ramping section 40, and an interface between the platform 24 and the ramping section. A hanger (hidden) connects the platform 24 to the ramping section 40.

As a non-limiting example, the platform 24 is at a certain elevation, and ramping section 40 extends from a ground surface to the elevation of the platform 24. Other configurations of ramp and/or platform assemblies, whether for residential or commercial applications, are also within the scope of the present disclosure. In accordance with ADA requirements, the grade of the ramp may be within a certain rise to run ratio (for example less than 1:12). Such ratio may vary for ramping deck surfaces depending on the rise and the distance between the desired high and low elevation points of the ramp.

In accordance with embodiments of the present disclosure, one or more of the platforms 24 and the ramping sections 40 include tread surfaces. Because ramp and/or platform assemblies in accordance with embodiments of the present disclosure provide decking surfaces upon which a user or a traveling body (such as a person walking or a wheelchair, bicycle, or scooter traveling) must traverse, the tread surfaces may be designed and configured to improve traction, reduce slippage, and/or reduce tripping.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A platform interface, comprising:
   a platform having a platform tread segment and a platform lip that at least partially define a slot;
   a hanger including a body having a first end and a second end, a flange outwardly extending from the body and having a flange lip with an outer flange surface, and a gap extending between the first end and the flange lip, the first end having a first end lip projecting toward the flange, the hanger being selectively mountable to the platform via engagement of the first end lip with the platform lip; and a ramping section having a first end and a second end defining a ramp tread segment therebetween, the ramping section further including a hook extending from the first end, the hook having an inner hook surface configured to engage the outer flange surface such that the platform supports the ramping section via the flange lip, wherein the outer flange surface has a radius of curvature that is less than a radius of curvature of the inner hook surface, wherein the inner hook surface is configured to engage the outer flange surface when the ramp tread segment forms a plurality of angles relative to the platform tread segment; and wherein the gap extending between the first end of the hanger and the flange lip is sized to prevent rotation of the hanger relative to the platform when both the first end of the hanger is engaged with the slot and the inner hook surface engages the outer flange surface.

2. The platform interface of claim 1, wherein the radius of curvature of the outer flange surface extends between 180 degrees and 350 degrees about a central axis of the flange lip.

3. The platform interface of claim 1, wherein the first end of the hanger has an inner radius of curvature that varies.

4. The platform interface of claim 1, wherein when the hook engages the flange lip, the hook and the platform lip form a gap therebetween that is less than or equal to 0.25 inches wide.

5. The platform interface of claim 1, wherein the ramping section is a ground transition adaptor.

6. A platform system, comprising:
a platform comprising a platform tread segment, a support segment extending from the platform tread segment, a platform lip extending from the platform tread segment and having a protrusion extending by a maximum protrusion distance toward the support segment, and a slot at least partially defined by the platform tread segment and the protrusion, the slot having a slot depth;
a ramping section comprising a ramp tread segment terminating in a hook, the hook having a hook thickness and an inner radius of curvature; and
a hanger, comprising:
a first end having a first end thickness and a first end insertion thickness, the first end insertion thickness exceeding the slot depth of the platform, wherein the first end insertion thickness of the hanger is a sum of the first end thickness and a first end protrusion distance;
a flange having a flange lip with an outer radius of curvature that is less than the inner radius of curvature of the hook; and
a gap between the first end and the flange, the gap having a gap width that is less than a sum of a) the hook thickness and b) the maximum protrusion distance of the protrusion.

7. A method of assembling a platform system comprising a platform, a hanger, and a ramping section, the method comprising:
inserting a first end of a hanger at least partially into a slot of the platform while the hanger is at a first angle relative to the platform;
rotating the hanger into a second angle relative to the platform such that the first end of the hanger engages the slot;
hooking a ramp hook on a flange lip of the hanger while the ramp hook is at a first angle relative to the hanger such that an inner hook surface of the ramp hook engages a first area of an outer flange surface of the flange lip; and
rotating the ramp hook into a second angle relative to the hanger such that the inner hook surface of the ramp hook engages a second area of the outer flange surface of the flange lip,
wherein the inner hook surface engages the outer flange surface continuously when the ramp hook is moved between the first and second angles relative to the hanger,
wherein the hanger cannot be disengaged from the slot and the ramp hook cannot be disengaged from the flange lip when both a) the first end of the hanger is inserted into the slot of the platform and rotated into the second angle relative to the platform and b) the ramp hook is engaged with the flange lip at the second angle relative to the hanger.

8. The method of claim 7, further comprising engaging a bottom surface of the hanger contats with a bottom segment of the platform.

9. A platform system, comprising:
a platform having a platform tread segment and a platform lip that at least partially define a slot;
a hanger including a body having a first end and a second end, a flange outwardly extending from the body and having an outer flange surface, and a gap extending between the first end and the flange, the first end having a first end lip projecting toward the flange, the hanger being selectively mountable to the platform via engagement of the first end lip with the platform lip, wherein the first end of the hanger has an inner radius of curvature that varies; and
a ramping section having a first end and a second end defining a ramp tread segment therebetween, the ramping section further including a hook extending from the first end, the hook having an inner hook surface configured to engage the outer flange surface such that the platform supports the ramping section via the flange lip.

10. The platform system of claim 9, wherein the gap extending between the first end of the hanger and the flange is sized to prevent rotation of the hanger relative to the platform when both the first end of the hanger is engaged with the slot and the inner hook surface engages the outer flange surface.

11. The platform system of claim 9, wherein the first end lip has an inner radius of curvature smaller than an inner radius of curvature of the body.

12. A platform system, comprising:
a platform defining a slot having a slot depth;
a ramping section having a ramp tread segment terminating in a hook, the hook having a hook thickness; and
a hanger, comprising:
a first end having a first end thickness and a first end insertion thickness, the first end insertion thickness exceeding the slot depth of the platform; and
a flange configured to receive the hook of the ramping section,
wherein the first end insertion thickness of the hanger is a sum of the first end thickness and a first end protrusion distance.

13. The platform system of claim 12, further comprising a platform lip extending from a platform tread segment of the platform and having a protrusion extending by a maximum protrusion distance into the slot, wherein a gap extends between the first end and the flange of the hanger, the gap having a gap width that is less than a sum of a) the hook thickness and b) the maximum protrusion distance of the protrusion.

* * * * *

UNITED STATES PATENT AND TRADEMARK OFFICE
CERTIFICATE OF CORRECTION

| | | |
|---|---|---|
| PATENT NO. | : 11,352,797 B2 | |
| APPLICATION NO. | : 16/439312 | |
| DATED | : June 7, 2022 | |
| INVENTOR(S) | : Ronald S. Winter | |

It is certified that error appears in the above-identified patent and that said Letters Patent is hereby corrected as shown below:

In the Claims

Column 14, Line 22, Claim 8, delete "contats"

Signed and Sealed this
Ninth Day of August, 2022

Katherine Kelly Vidal
*Director of the United States Patent and Trademark Office*